Nov. 6, 1934.  K. M. BURDGE  1,979,604
BEVERAGE COOLING AND DISPENSING APPARATUS
Filed Dec. 6, 1933  2 Sheets-Sheet 1
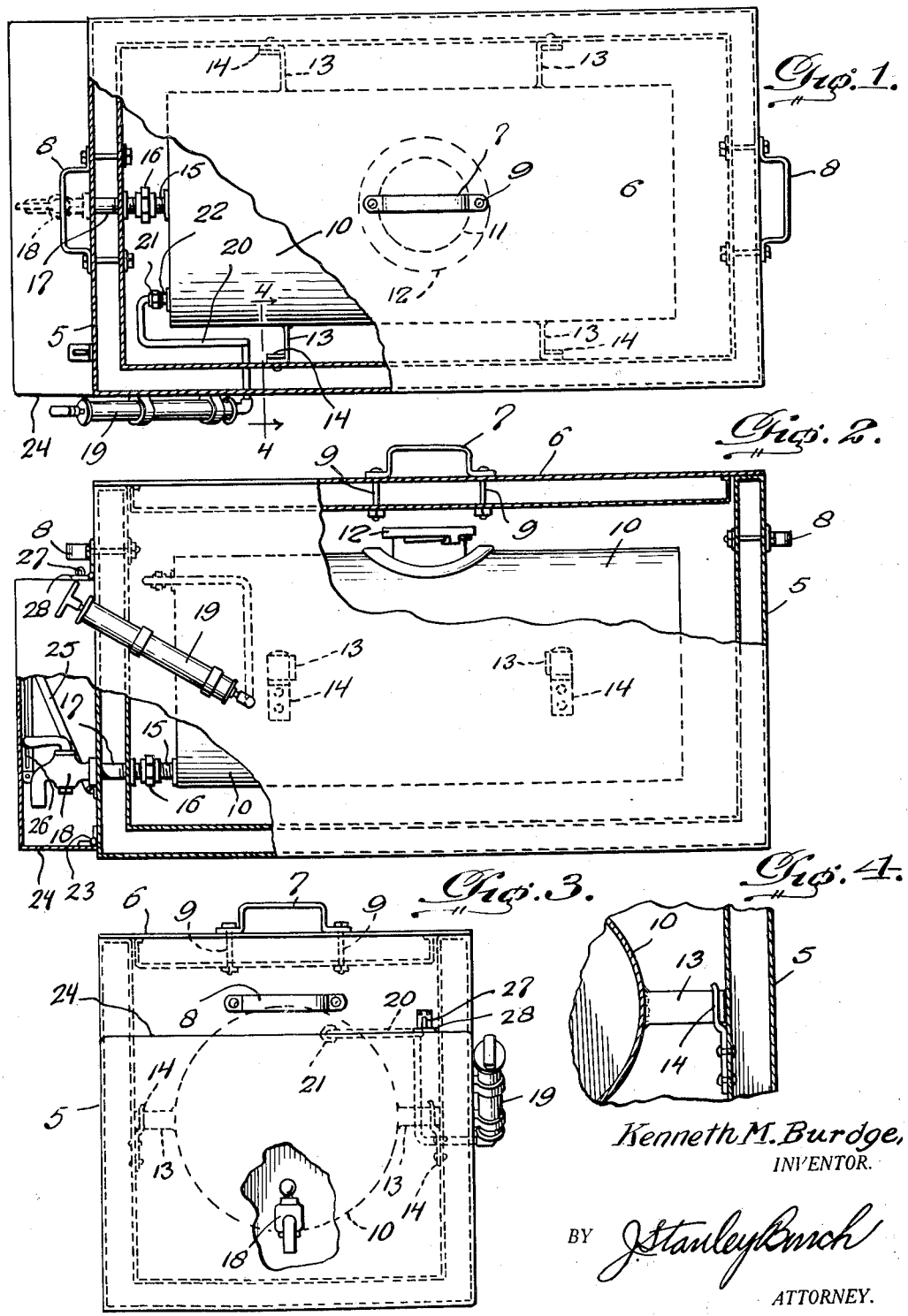

Nov. 6, 1934.  K. M. BURDGE  1,979,604
BEVERAGE COOLING AND DISPENSING APPARATUS
Filed Dec. 6, 1933  2 Sheets-Sheet 2
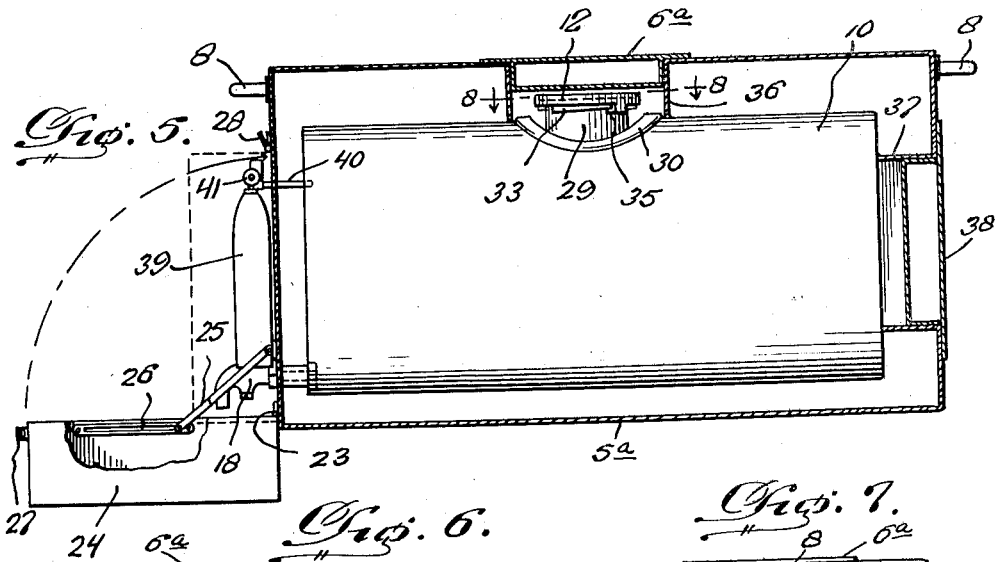
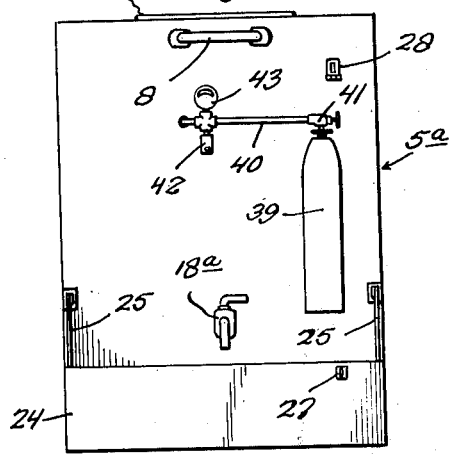
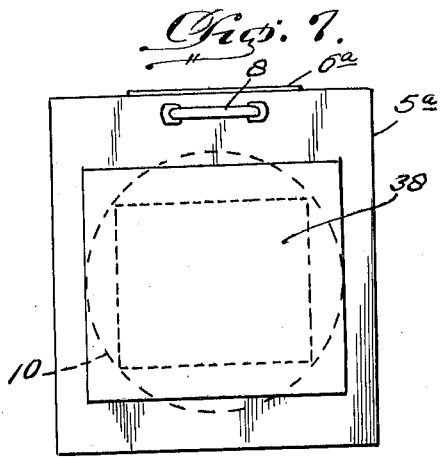
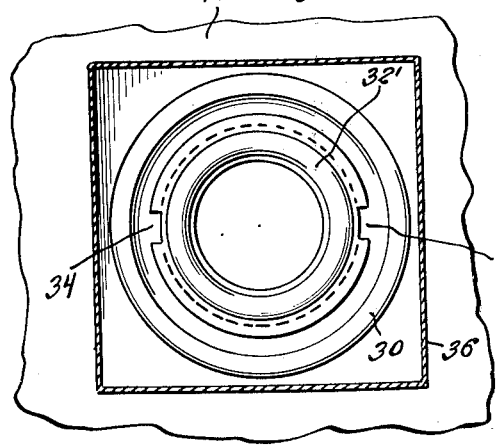
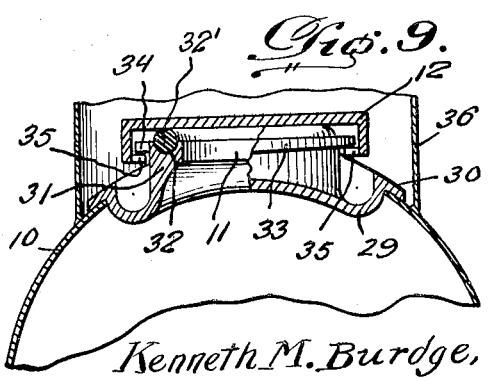
Kenneth M. Burdge,
INVENTOR.
BY J. Stanley Burch
ATTORNEY.

Patented Nov. 6, 1934

1,979,604

UNITED STATES PATENT OFFICE 1,979,604

BEVERAGE COOLING AND DISPENSING APPARATUS

Kenneth M. Burdge, Cincinnati, Ohio

Application December 6, 1933, Serial No. 701,190

7 Claims. (Cl. 225—40)

My invention relates to apparatus for cooling and dispensing beer and other beverages, and the primary object of the invention is to provide an apparatus of this kind which is extremely simple in construction and efficient in use.

A further object of the invention is to provide an apparatus of the above kind especially suitable for home use and so constructed that the parts thereof may be readily assembled and taken apart to facilitate cleaning or making of repairs.

With the foregoing and other objects in view, the present invention consists in the novel form, combination and arrangement of parts hereinafter more fully described, shown in the accompanying drawings and claimed.

In the drawings:

Figure 1 is a top plan view, partly broken away and in horizontal section, of a beverage cooling and dispensing apparatus constructed in accordance with the present invention.

Figure 2 is a side elevational view, partly broken away and in vertical section, of the apparatus shown in Figure 1.

Figure 3 is a front elevational view thereof partly broken away.

Figure 4 is a fragmentary vertical transverse section on the plane of line 4—4 of Figure 1.

Figure 5 illustrates a modified form of the invention, mainly in vertical longitudinal section, but with parts in side elevation and partly broken away.

Figure 6 is a front elevational view of the construction shown in Figure 5.

Figure 7 is a similar view with the drain pan in upwardly swung inoperative position.

Figure 8 is an enlarged fragmentary horizontal section taken on the plane of line 8—8 of Figure 5, with the cap of the tank closure removed; and Figure 9 is a fragmentary view partly in elevation and partly in vertical transverse section, showing the tank closure in detail.

Referring in detail to the drawings, the embodiment of the invention illustrated in Figures 1 to 4 includes a rectangular outer receptacle 5, preferably constructed of metal, and having a removable lid 6 provided with a handle 7, said outer receptacle and its lid being of spaced double-walled construction for heat insulating purposes. Obviously, the spaces between these walls of the receptacle and its cover may be filled with any suitable heat insulating or non-conducting substance, if desired. To facilitate carrying of the apparatus, the receptacle 5 may be provided with end handles 8, and the handles 7 and 8 are preferably of U-shape strap metal construction with outturned ends bolted to the cover and to the walls of the receptacle, respectively, as at 9.

Removably mounted within the outer receptacle 5 is a horizontal cylindrical beverage container or metal tank 10 having a top filling opening at 11 closed by a removable cap or cover 12, the container or tank 10 being sustained in spaced relation to the walls of receptacle 5 and the lid 6 by means of angular supporting arms 13 rigid with and projecting laterally from the sides of container or tank 10 and detachably connected at their outer ends to the side walls of outer receptacle 5 in any suitable or preferred manner. As shown, the outer ends of the supporting arms 13 may project in opposite directions and be seated upon and behind suitable clips or keepers 14 attached to the sides of outer receptacle 5, so that upward removable of the container or tank 10 is permitted although lateral or longitudinal shifting thereof within the receptacle 5 is prevented. The beverage container or tank 10 is provided at its front end and at the bottom of the same with an outlet nipple 15 detachably connected by a union or coupling 16 with the inner end of a pipe 17 extending through the front of receptacle 5 and equipped at its outer projecting end with a suitable faucet 18. It will of course be understood that the space between the beverage container or tank 10 and the walls of outer receptacle 5 is adapted to be filled with ice for the purpose of cooling the beverage in and to be dispensed from said container or tank 10 through the outlet 15, 17, under control of faucet 18.

Mounted on the outside of outer receptacle 5 on one side of and at the front of the latter is a hand-operated air pump 19 of ordinary construction supported rigidly in a rearwardly and downwardly inclined position so as to be very conveniently and easily actuated by a person standing in front of the apparatus with the latter supported at a relatively low elevation, as upon a desk or bench. An air discharge pipe 20 is connected at one end to the compressed air outlet of pump 19 at the rear lower end of the latter, and this pipe 20 extends laterally inwardly through the adjacent side of receptacle 5 and then forwardly to a point in front of the beverage container or tank 10 where it is detachably coupled as at 21 with a compressed air inlet nipple 22 provided on the front end of beverage container or tank 10 near the top and the adjacent side of the latter.

It will be understood that the pump 19 is operated to force air under pressure through pipe 20 into the upper portion of container or tank 10 for the purpose of forcing the beverage from the latter upon opening faucet 18. By packing ice within the outer receptacle 5 and around the container or tank 10, the beverage in the latter is maintained cool, and the supply of the beverage in container or tank 10 may be replenished from time to time as may be found necessary upon removing lid 6 and stopper 12. By uncoupling the parts at 16 and 21, the tank 10 may be readily removed to facilitate cleaning or repair of the apparatus. It is obvious that suitable means may be provided to facilitate drainage of water from receptacle 5 resulting from melting of the ice therein.

Hinged at 23 to the front of receptacle 5 near the bottom of the latter is a drain pan 24 adapted to swing downwardly to a forwardly projecting horizontal position when required for use, and to be swung upwardly to a vertical position against the front of receptacle 5 when not required for use. Suitable means may be provided for sustaining the drip pan in its operative horizontal position, such as links 25 hinged to the front of receptacle 5 and slidably connected at 26 to the sides of drain pan 24. Suitable means is also provided to secure the drain pan 24 in its upwardly swung inoperative position, such as a keeper 27 on the front wall of the pan 24 to be engaged by a hasp 28 attached to the front wall of receptacle 5, the shackle of a pad lock being preferably engaged in the keeper 27 to lock the drain pan in its inoperative position wherein it encloses the faucet 18 and prevents unauthorized discharge of the fluid from tank 10. The drain pan and its associated parts are more clearly illustrated in Figures 5 and 6, and as such parts are of identical construction in connection with both forms of the invention, they are indicated by like reference numerals in all of the views.

The tank closure including the cap 12 is also of the same construction in both forms of the invention, and for this reason the parts of such closure are also indicated by like reference characters in all of the views. The construction of such tank closure is more clearly illustrated in Figures 5, 8 and 9, and it will be seen that the same preferably embodies a cast metal neck member 29 providing the filling opening 11 and having a flange 30 welded to the wall of tank 10. The wall of neck member 29 is thickened near its upper edge as at 31, and formed in such thickened upper edge portion is a relatively wide annular groove 32 in which is seated the lower portion of a relatively large resilient annular gasket or sealing ring 32', of circular cross section. The neck member 29 further has an outwardly directed annular flange 33 at its upper edge which is provided with diametrically opposite notches or slots 34. In addition, the under surface of the flange 33 is inclined from corresponding sides of the slots 34 in cam formation. The cap or cover 12 is adapted to fit over the upper end of neck member 29 with its top wall resting on the top of gasket or sealing ring 32', the cap 12 having a rim depending below the flange 33 and provided at the lower edge of such rim with diametrically opposite inwardly extending lugs 35 adapted to pass through the slots 34 to a position directly beneath the flange 33 when the closure cap is applied to the neck member 29. The arrangement is such that when the cap 12 is turned after being applied to the neck member, the lugs 35 will engage the inclined lower surfaces of the flange 33 and act to tightly draw the cap 12 downwardly so as to seat it tightly against the annular gasket or sealing ring 32 and place the latter under compression. An air tight closure is thus had which will not become accidentally disengaged, but which may be readily manually removed.

The embodiment of the invention illustrated in Figures 5 to 9 inclusive further includes a rectangular outer receptacle 5a, preferably constructed of metal, and provided with a top wall formed with a central opening closed by a removable insulated plug or lid 6a. Depending from the top wall of receptacle 5a in surrounding relation to its central opening, is a tubular entrance member 36 surrounding the neck member 29 and its cap 12 and welded at its lower edge to the top of tank 10 in surrounding relation to the flange 30 of said neck member 29. The tank 10 is permanently sustained in spaced relation to the walls of receptacle 5a, and suitable heat insulating material is packed about said tank 10 within the receptacle 5a, the tubular entrance member 38 keeping the heat insulating material away from the tank closure so that the same will not interfere with access to and removal of the cap 12 upon removal of the lid 6a of the outer receptacle 5a. This form of the invention is especially adapted for use where it is convenient or desirable to cool the contents of tank 10 by the use of carbon dioxide ice. Due to the extremity low temperature of carbon dioxide ice, it is not necessary to pack the same entirely about the tank 10, as practiced with the use of water ice in connection with the embodiment shown in Figures 1 to 4 inclusive. In other words, only a relatively small part of the surface area of tank 10 may be subjected to the cooling influence of carbon dioxide ice when the latter is used. Accordingly, with the construction of Figures 5 to 9 inclusive, the receptacle 5a is provided with a central opening at its rear end, and projecting inwardly from the rear wall of receptacle 5a in surrounding relation to the latter opening of said receptacle 5a is a tubular member 37 which is welded at its inner edge to the rear end wall of tank 10. The tubular member 37 thus forms a compartment in which a suitable quantity of carbon dioxide ice may be placed to contact the adjacent portion of the rear end wall of tank 10 to cool the contents of the latter. This carbon dioxide ice is maintained in the compartment thus formed by means of a plug-like closure 38 fitted in the opening in the rear end wall of receptacle 5a and in the outer portion of tubular member 37, the plug-like closure 38 being of doubled wall construction for heat insulating purposes so that unduly rapid sublimation of the carbon dioxide ice will not take place when the closure 38 is in position. Any suitable heat insulating material may be of course packed within the space between the walls of closure 38.

The form of the invention shown in Figures 5 to 9 inclusive also include a faucet 18a connected to the front end of tank 10 for controlling discharge of the fluid from the latter. In this embodiment of the invention, the fluid in tank 10 is maintained under pressure by compressed air supplied from a compressed air storage tank 39 mounted on the front wall of receptacle 5a and connected by a pipe 40 to the top of tank 10 through the front end of the latter. The tank 39 preferably has a valve controlled outlet 41, whereby the degree of pressure to which the contents of tank 10 is subjected may be properly controlled. Also, the pipe 40 may be equipped with a suitable safety relief valve 42 and a pressure gage 43 for obvious purposes. The arrangement in this construction is such that the drain pan 24 will enclose the parts 39 to 43 inclusive in addition to the faucet 18a when said drain pan is swung upwardly to its dotted line inoperative position of Figures 5 and 7.

It is pointed out that the essential distinction between the devices of Figure 1 and Figure 5, is that one is adapted for use in connection with water ice while the other is adapted for use in connection with carbon dioxide ice. Obviously, the compressed air for the construction of Figure 5 might be supplied by a hand pump as in Figure 1, or the compressed air for the device of Figure 1 may be supplied from a compressed air reservoir as in Figure 5. In other words, the source of compressed air supply is optional with either embodiment of the invention, as will be obvious.

A dispensing apparatus of the improved construction illustrated and described is comparatively simple, can be easily transported and placed in use, may be cheaply manufactured, can be readily assembled or taken apart, and provides efficient and economical means for the cooling and dispensing of beverages and the like.

What I claim as new is:

1. A beverage cooling and dispensing apparatus comprising, in combination, a metallic outer receptacle having a removable lid, said receptacle and its lid being of spaced double-wall construction, a horizontal cylindrical beverage container mounted within said outer receptacle and sustained in spaced relation to the walls of the latter and to the lid to provide for the packing of ice within the outer receptacle completely around the beverage container, said beverage container having a top filling opening provided with a removable closure and further having a beverage outlet in its front wall and at the bottom of the same, a beverage discharge pipe connected to said outlet and extending through the front of the outer receptacle, a faucet connected to the projecting end of said discharge pipe, a hand-operated air pump rigidly mounted on one side of the outer receptacle near the front of the latter in a rearwardly and downwardly inclined position and with its compressed air outlet at the lower rear end thereof, said beverage container having a compressed air inlet in the front end thereof and near the top of the same, and a compressed air conducting pipe extending through the side of the outer receptacle and connecting the compressed air outlet of the pump with the compressed air inlet of said beverage container.

2. A beverage cooling and dispensing apparatus comprising, in combination, a metallic outer receptacle having a removable lid, said receptacle and its lid being of spaced double-wall construction, a horizontal cylindrical beverage container mounted within said outer receptacle and sustained in spaced relation to the walls of the latter and to the lid to provide for the packing of ice within the outer receptacle completely around the beverage container, said beverage container having a top filling opening provided with a removable closure and further having a beverage outlet in its front wall and at the bottom of the same, a beverage discharge pipe connected to said outlet and extending through the front of the outer receptacle, a faucet connected to the projecting end of said discharge pipe, a hand-operated air pump rigidly mounted on one side of the outer receptacle near the front of the latter in a rearwardly and downwardly inclined position and with its compressed air outlet at the lower rear end thereof, said beverage container having a compressed air inlet in the front end thereof and near the top of the same, and a compressed air conducting pipe extending through the side of the outer receptacle and connecting the compressed air outlet of the pump with the compressed air inlet of said beverage container, means detachably coupling the beverage discharge pipe with the beverage outlet of the beverage container, and means detachably connecting the compressed air pipe with the compressed air inlet of said beverage container.

3. A beverage cooling and dispensing apparatus comprising, in combination, a metallic outer receptacle having a removable lid, said receptacle and its lid being of spaced double-wall construction, a horizontal cylindrical beverage container mounted within said outer receptacle and sustained in spaced relation to the walls of the latter and to the lid to provide for the packing of ice within the outer receptacle completely around the beverage container, said beverage container having a top filling opening provided with a removable closure and further having a beverage outlet in its front wall and at the bottom of the same, a beverage discharge pipe connected to said outlet and extending through the front of the outer receptacle, a faucet connected to the projecting end of said discharge pipe, a hand-operated air pump rigidly mounted on one side of the outer receptacle near the front of the latter in a rearwardly and downwardly inclined position and with its compressed air outlet at the lower rear end thereof, said beverage container having a compressed air inlet in the front end thereof and near the top of the same, and a compressed air conducting pipe extending through the side of the outer receptacle and connecting the compressed air outlet of the pump with the compressed air inlet of said beverage container, means detachably coupling the beverage discharge pipe with the beverage outlet of the beverage container, and means detachably connecting the compressed air pipe with the compressed air inlet of said beverage container, the mounting means for the beverage container consisting of angular arms rigid with and extending laterally from the sides of the beverage container, and keepers mounted on the sides of the outer receptacle and having the ends of said supporting arm removably engaged therebehind.

4. A beverage cooling and dispensing apparatus comprising a rectangular outer receptacle having a top opening provided with a lid, a horizontal fluid containing tank mounted within and completely spaced from the walls of said outer receptacle, said tank having a top filling opening provided with an air tight closure and accessible through the top opening of the outer receptacle, there being a space between the tank and the outer receptacle for reception of ice to cool the contents of said tank, heat insulation surrounding the tank, a discharge faucet on the front of the outer receptacle and connected to the front of the tank near the bottom of the latter, and means to place the contents of the tank under pressure including air pressure supplying means mounted on the outside of the outer receptacle.

5. A beverage cooling and dispensing apparatus comprising a rectangular outer receptacle having a top opening provided with a lid, a horizontal fluid containing tank mounted within and completely spaced from the walls of said outer receptacle, said tank having a top filling opening provided with an air tight closure and accessible through the top opening of the outer receptacle, there being a space between the tank and the outer receptacle for reception of ice to cool the contents of said tank, heat insulation surrounding the tank, a discharge faucet on the front of the outer receptacle and connected to the front of the tank near the bottom of the latter, means to place the contents of the tank under pressure including air pressure supplying means mounted on the outside of the outer receptacle, a drain pan hinged to the front of the outer receptacle and arranged to swing upwardly to a vertical inoperative position enclosing the faucet, means to sustain said drain pan in a horizontal downwardly swung operative position, and means to releasably retain the drain pan in its upwardly swung inoperative position.

6. A beverage cooling and dispensing apparatus comprising a rectangular outer receptacle having a top opening provided with a lid, a horizontal fluid containing tank mounted within and completely spaced from the walls of said outer receptacle, said tank having a top filling opening provided with an air tight closure and accessible through the top opening of the outer receptacle, there being a space between the tank and the outer receptacle for reception of ice to cool the contents of said tank, heat insulation surrounding the tank, a discharge faucet on the front of the outer receptacle and connected to the front of the tank near the bottom of the latter, means to place the contents of the tank under pressure including air pressure supplying means mounted on the outside of the outer receptacle, a drain pan hinged to the front of the outer receptacle and arranged to swing upwardly to a vertical inoperative position enclosing the faucet, means to sustain said drain pan in a horizontal downwardly swung operative position, and means to releasably retain the drain pan in its upwardly swung inoperative position, said air supplying means including a receptacle containing air under pressure and mounted on the front of the outer receptacle in position to be enclosed by the drain pan when swung to its vertical inoperative position.

7. A beverage cooling and dispensing apparatus comprising a rectangular outer receptacle having a top opening provided with a lid, a horizontal fluid containing tank mounted within and completely spaced from the walls of said outer receptacle, said tank having a top filling opening provided with an air tight closure and accessible through the top opening of the outer receptacle, heat insulation surrounding the tank, a discharge faucet on the front of the outer receptacle and connected to the front of the tank near the bottom of the latter, and means to place the contents of the tank under pressure including air pressure supplying means mounted on the outside of the outer receptacle, a tubular member connecting the outer receptacle with the top of the tank in surrounding relation to the tank closure and the top opening of the outer receptacle, a second tubular member connecting the rear wall of the outer receptacle with the rear end of the tank and forming a compartment for reception of carbon dioxide ice to cool the contents of the tank, the rear wall of the outer receptacle having an opening to permit access to said compartment, a removable closure for said compartment, said heat insulating material being packed about the tank and between the latter and the outer receptacle around said tubular members.

KENNETH M. BURDGE.